(12) United States Patent
Buentello et al.

(10) Patent No.: US 11,816,747 B1
(45) Date of Patent: Nov. 14, 2023

(54) SYSTEMS AND METHODS FOR MINING DATA FOR PROPERTY USAGE

(71) Applicant: United Services Automobile Association (USAA), San Antonio, TX (US)

(72) Inventors: Andre Rene Buentello, San Antonio, TX (US); Mark Anthony Lopez, Helotes, TX (US); Gregory Brian Meyer, San Antonio, TX (US); Ashley Raine Philbrick, San Antonio, TX (US); Garrett Rielly Rapport, San Antonio, TX (US); Jose L. Romero, Jr., San Antonio, TX (US); Michael Jay Szentes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 536 days.

(21) Appl. No.: 16/537,078

(22) Filed: Aug. 9, 2019

Related U.S. Application Data

(60) Provisional application No. 62/778,747, filed on Dec. 12, 2018.

(51) Int. Cl.
    *G06Q 50/16* (2012.01)
    *G06Q 30/0645* (2023.01)
    *G06N 5/04* (2023.01)

(52) U.S. Cl.
    CPC ............. *G06Q 50/163* (2013.01); *G06N 5/04* (2013.01); *G06Q 30/0645* (2013.01)

(58) Field of Classification Search
    None
    See application file for complete search history.

(56) References Cited

U.S. PATENT DOCUMENTS

| | | | |
|---|---|---|---|
| 9,361,583 B1 * | 6/2016 | Holloway | G06F 16/24575 |
| 9,911,042 B1 * | 3/2018 | Cardona | G06F 16/9535 |
| 10,002,295 B1 * | 6/2018 | Cardona | G06Q 50/16 |
| 10,074,111 B2 * | 9/2018 | Humphries | G06Q 30/02 |

(Continued)

OTHER PUBLICATIONS

Abdallah, Sherief, and Deena Abu Khashan. "Using text mining to analyze real estate classifieds." Proceedings of the International Conference on Advanced Intelligent Systems and Informatics 2016 2. Springer International Publishing, 2017.*

*Primary Examiner* — Peter Ludwig
*Assistant Examiner* — Donald J Edmonds
(74) *Attorney, Agent, or Firm* — Fletcher Yoder, P.C.

(57) ABSTRACT

Systems and methods for detecting use of a property are provided. A first set of property identifying data for a first property is received from a first source. The first source indicates a use of the first property but does not publicly provide an address of the first property prior to initiation of a request for use of the first property. A second set of property identifying data for a second property from a second source is also received. The second source provides a property address of the second property. The first set of data are compared to the second set of data, to determine an amount of overlap. When the amount of overlap meets a pre-defined threshold amount, the first property and the second property are identified as a common property and a notice is provided of the property address and the use of the common property.

20 Claims, 11 Drawing Sheets

(56) References Cited

U.S. PATENT DOCUMENTS

| | | | | |
|---|---|---|---|---|
| 2005/0004927 A1* | 1/2005 | Singer | ................... | G06Q 30/02 |
| 2005/0080702 A1* | 4/2005 | Modi | ................... | G06Q 40/06 |
| | | | | 705/36 R |
| 2005/0192930 A1* | 9/2005 | Hightower | ............. | G06Q 30/02 |
| 2005/0273346 A1* | 12/2005 | Frost | .................... | G06Q 50/167 |
| | | | | 705/26.1 |
| 2006/0206505 A1* | 9/2006 | Hyder | ................... | G06Q 10/10 |
| 2006/0206584 A1* | 9/2006 | Hyder | ................... | G06Q 30/08 |
| | | | | 707/E17.116 |
| 2010/0198714 A1* | 8/2010 | Orfano | .................. | G06Q 40/00 |
| | | | | 705/306 |
| 2010/0241558 A1* | 9/2010 | Chmielewski | ..... | G06Q 30/0185 |
| | | | | 707/723 |
| 2012/0059756 A1* | 3/2012 | Serio | .................... | G06Q 40/03 |
| | | | | 705/38 |
| 2012/0239583 A1* | 9/2012 | Dobrowolski | ......... | G06Q 10/10 |
| | | | | 705/307 |
| 2014/0164378 A1* | 6/2014 | Levandoski | ............ | G06F 16/25 |
| | | | | 707/737 |
| 2014/0279386 A1* | 9/2014 | Meyer | ................... | G06Q 50/16 |
| | | | | 705/38 |
| 2015/0317701 A1* | 11/2015 | Thomas | ................. | G06Q 50/16 |
| | | | | 705/306 |
| 2016/0012554 A1* | 1/2016 | Dell Orfano | .......... | G06Q 30/06 |
| | | | | 705/313 |
| 2016/0189309 A1* | 6/2016 | Bushell | ................. | G06Q 40/08 |
| | | | | 705/4 |
| 2016/0267610 A1* | 9/2016 | Corbett | ................. | G06F 16/583 |
| 2017/0053357 A1* | 2/2017 | Bowman | ............ | G06F 16/2471 |
| 2018/0101504 A1* | 4/2018 | DiTomaso | ............. | G06T 13/80 |
| 2018/0211327 A1* | 7/2018 | Taylor | .................... | G06Q 90/00 |
| 2018/0225785 A1* | 8/2018 | Schwartz | ........... | G06Q 30/0645 |
| 2018/0322597 A1* | 11/2018 | Sher | ..................... | G06Q 50/163 |

* cited by examiner

ENTIRE HOUSE
Extraordinary Home with heated pool/theater/sauna
Houston

ENTIRE HOUSE
6 guests   3 bedrooms   3 beds   3 baths

Hosted by Nic

Houston, Texas, United States · Joined in February 2012
★ 35 Reviews ⊚ Verified
Professional Traveler
Response rate: 75%
Response time: within a few hours

[Contact host]

Extraordinary Memorial Park home on large private lot in Rice Military. Gated entry leads to grand foyer with spiral staircase and custom ironwork. Elegant formals with vaulted ceilings and inlaid reclaimed oak floors. Viking appliances, Brazilian granite, & custom cabinets. Media room w/ a 17' screen, web bar and balcony. First floor Master suite w/luxurious marble bath, rainfall shower & jetted tub. Lush landscaping with pool (heated), spa, tanning ledge, terrace & a 3 car garage!

Contact host

Always communicate through Airbnb. To protect your payment, never transfer money or communicate outside of the Airbnb website or app. Learn more Amenities
- Kitchen          - Gym
- Hot tub          - Wifi
- Free parking on premises   - Pool Show all 12 amenities 3 Reviews ★★★★☆

| Accuracy | ★★★★☆ | Location | ★★★★☆ |
| Communication | ★★★★☆ | Check-in | ★★★★☆ |
| Cleanliness | ★★★★☆ | Value | ★★★☆☆ |

🔍 Search reviews

John
August 2018
The house accommodated my travel needs, amazing neighborhood/neighbors, and I would definitely recommend this place for a large family!

Ivan
July 2018
The host canceled this reservation 56 days before arrival. This is an automated posting.

Jessie
July 2018
Nice house. Nice host. But he didn't even answer me for messages I asked to pick stuff which I forgot over. Pls response, those are important to me Sleeping arrangements

| Bedroom 1 | Bedroom 2 | Bedroom 3 |
| 1 king bed | 1 queen bed | 1 queen bed |

*FIG. 4C*

INTERIOR FEATURES

Bedrooms
Beds: 3 ← 166

Bathrooms
Baths: 2 full, 2 half ← 168

Heating and Cooling
Heating: Other
Cooling: Central
Cool System: Central Electric
Heat System: Central Electric, Central Gas Appliances
Oven Type:
Double Oven, Gas Oven, Convection Oven
Range Type: Gas Range

BUILDING

Size
Sq Ft Source: Appraisal District
Amenities
Fireplace Description: Gaslog Fireplace

SPACES AND AMENITIES

Size
Unit Count: 0

Spaces
Pool ← 154

Flooring
Floor size: 3,749 sqft ← 148
Floors: Carpet, Tile, Stone, Wood

Other Interior Features
Fireplace
Room count: 8
Interior:
Breakfast Bar, Fire/Smoke Alarm, High Ceiling, Island Kitchen, Spa/Hot Tub, Refrigerator Included, Alarm System – Owned, Drapes/Curtains/Window Cove Hollywood Bath, Elevator, Dryer Include Washer Included, Atrium Other Building Features
Connections:
Washer Connections, Gas Dryer Connections
Roof: Tile Amenities
Elevator

CONSTRUCTION

Type and Style
Single Family
Style: Mediterranean, Spanish

Materials
Exterior Material: Stucco ← 156
Foundation type: Slab
Foundation: Slab on Builders Pier
Siding: Stucco ← 156

EXTERIOR FEATURES

Water
Pool ← 154
View Type
Front Door Faces: North

Lot
Lot: 3,685 sqft ← 150
Lot Size Source: Appraisal District
Lot Description: Cul-DE-Sac
Acres Description: 0 Up To 1/4 Acre

COMMUNITY AND NEIGHBORHOOD

Location
Geo Market Area:
Rice Military/Washington Corridor ← 162
Schools
School district: 27 - Houston Dates
Last remodel year: 2007
Built in 2007 ← 152

Other Construction Features
Stories: 4

Other Exterior Features
Parcel #: 128787002009
Exterior
164 { Patio/Deck, Controlled Subdivision Access, Sprinkler System, Spa/Hot Tub, Rooftop Deck, Outdoor Kitchen, Fully Fenced, Balcony
154 { Pool Private Desc: Gunite, In Ground, Heated Community Features
Access: Manned Gate
Street Surface: Concrete, Curbs
Golf Course: Memorial Park Golf Course

*FIG. 5B*

PARKING

Parking:
- 170 → Attached Garage, 2 spaces, 462 sqft garage
- 172 → Garage Desc: Attached Garage Garage Carport:
Double-Wide Driveway, Auto Garage Door Opener

---

UTILITIES

Utilities

Water Sewer: Public Water, Public Sewer

Green Energy

Energy:
Ceiling Fans, Digital Program Thermostat, Energy Star Appliances, Energy Star/CFL/LED Lights, High-Efficiency HVAC, Insulated Doors, Insulated/Low-E windows, Tankless/On-Demand H2O Heater, North/South Exposure, Insulation - Spray-Foam, Generator Green Energy Great solar potential
Sun Number™: 94

---

Sources

MLS#: 81491895

*FIG. 5C*

SYSTEMS AND METHODS FOR MINING DATA FOR PROPERTY USAGE

CROSS-REFERENCES TO RELATED APPLICATIONS

The present disclosure is related to, and claims priority to, U.S. Provisional Patent Application Ser. No. 62/778,747, titled "Systems and Methods for Mining Data for Property Usage," which was filed on Dec. 12, 2018, which is herein incorporated by reference in its entirety for all purposes.

BACKGROUND

The present disclosure relates generally to property monitoring certain conditions related to the property to determine a usage of the property. Property usage may be useful for many purposes, including automatic adjustment of services for the property based at least in part on a use indicated by the monitored conditions.

DRAWINGS

These and other features, aspects, and advantages of the present disclosure will become better understood when the following detailed description is read with reference to the accompanying drawings in which like characters represent like parts throughout the drawings, wherein:

FIGS. 4A-4D illustrate screen shots of an exemplary first source that indicates a certain property use type (e.g., renting), which is used by the property use identification property system of FIG. 1, in accordance with embodiments described herein;

FIGS. 5A-5D illustrate screen shots of an exemplary second source that indicates a property address, which is used by the property use identification property system of FIG. 1, in accordance with embodiments described herein.

DETAILED DESCRIPTION

Figure 1:
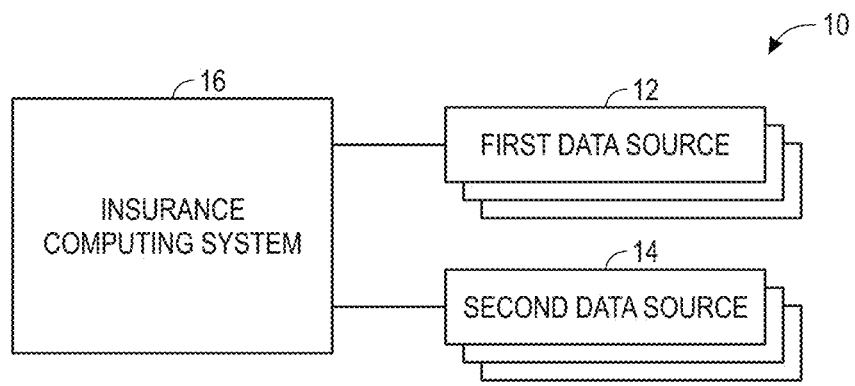
FIG. 1 illustrates a block diagram of a property use identification system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Use of a property may change over time. Thus, it may be beneficial to understand changes of use to a property. This may be done using online data mining. For example, property data from a plurality of online services may be accumulated and compared to identify new uses of a property. For example, a first service may provide property information with a complete property address. For example, a property owner may place his or her property on the market to sell when the property owner desires to move. This type of service typically includes a property address with the available data. In some instances, the property owner lists the property on a real estate selling service site (e.g., Zillow, Trulia, etc.) or information about the property may be otherwise acquired by such a service.

The information from this type of service may be cross-referenced with a second service that indicates a particular type of use of the property. For example, the property owner may list the same property on a rental listing service for short term rentals (e.g., AirBnb, HomeAway, etc.). The property use identification system may receive an analyze data obtained from one or more first data sources (e.g., the rental listing service) and a second data source (e.g., the real estate selling services). The property use identification system may receive various types of data associated with the first data source and the second data source.

The first data source does not usually list a property address due to the nature of rental listing services. Specifically, most rental listing services do not provide the property address to the renter until payment is received and any other necessary requirements (e.g., security checks) are complete. The first data source includes various property identifying data that does not include a property address. The first set of property identifying data may include, but is not limited to a geographic area, a zip code, a neighborhood name, an intersection, a property description, a number of bedrooms, a number of bathrooms, a property image, a general vicinity, a property owner's name, a property owner's contact information, or an amount of time from a landmark. The second data source does list a property address. The second data source also includes various property identifying data, including but not limited to a listing price, a listing type, a number of days listed, a number of square feet, a lot size, a year built, a keyword, a building material, a geographic area, a zip code, a neighborhood, a property description, a number of bedrooms, a number of bathrooms, a number of spaces for a parking garage, a parking garage description, or a proximity to or an amount of time from a landmark.

In this way, the property use identification system may compare the first set of property identifying data to the second set of property identifying data. The insurance computing system may compare one or more of the first set of property identifying data (e.g., a zip code) to one or more of the second set of property identifying data (e.g., a listing type). The insurance computing system 16 may be repeated until all or a portion of the sets of property identifying data have been compared. Once the insurance computing system has compared the first set of property identifying data to the second set of property identifying data, the insurance computing system identifies when the first set of property identifying data overlaps with the second set of property identifying data by more than a threshold amount. If the insurance computing system determines that the first set of property identifying data overlaps with the second set of property identifying data by more than the threshold amount, the insurance computing system may generate a notice to alert the insurance provider the use of the property has changed. The insurance provider may then review the matched identifying data. In some embodiments, the insurance provider may determine that the property insurance policy should be adjusted based upon the matched identifying data.

With the foregoing in mind, FIG. 1 illustrates a block diagram of a property use identification property system 10 that may be configured to determine and/or adjust an insurance policy (e.g., an insurance rate) for a particular property (e.g., a single family dwelling). The property may be any suitable residence (e.g., apartment, townhouse, condominium, single family property, etc.), and may receive data from a first data source 12 (e.g., a rental listing service) and a second data source 14 (e.g., a real estate selling service).

As shown, the property use identification property system 10 includes a computing system 16 (e.g., computational platform). The computing system 16 may include or be part of a cloud service that utilizes multiple computing systems 16 or the like, and it should be understood that all or some of the processing functions described herein with respect to the computing system 16 may be carried out any other suitable computing system.

The computing system 16 may be configured to receive data from the first data source 12 (e.g., a rental listing service), such as AirBnb, HomeAway, Vacation Rental By Owner, Craigslist, or any other rental listing service. In many instances, these types of services may indicate a particular use for a property, but may not provide a specific address of the property without completing detailed processing of a service request. However, using the techniques described herein, the first data source 12 may provide a first set of property identifying data that may be cross-referenced with a second data source 14, to determine an address (or other unique identifying information) of the particular property and, thus, identify particular uses of particular properties. As mentioned above, the first data source 12 includes various types of data included in the first set of property identifying data that does not include a property address, at least without providing a service request. Examples of the first set of property identifying data may include, but is not limited to a geographic area, a zip code, a neighborhood name, an intersection, a property description, a number of bedrooms, a number of bathrooms, one or more first property images, a general vicinity, a property owner's name, a property owner's contact information, or an amount of time from a landmark.

The computing system 16 may receive data from the second data source 14 (e.g., a real estate selling service), such as Zillow, Trulia, Redfin, Realtor.com, Century 21, or any other service that does provide particular address or other unique identifying property information (e.g., a real estate listing service). As explained in detail below, the second set of property identifying data may be compared with the first set of property identifying data to determine whether an address of a property listed on the second data source 14 corresponds to a property that does not have a listed address on the first data source 12. The second data source 14 includes several types of data in the second set of property identifying data, including, but not limited to a listing price, a listing type, a number of days listed, a number of square feet, a lot size, a year built, a keyword, a building material, a geographic area, a zip code, a neighborhood, a property description, a number of bedrooms, a number of bathrooms, a number of spaces for a parking garage, a parking garage description, one or more second property images, or a proximity to or an amount of time from a landmark. It may be appreciated that the second set of property identifying data may include the property's address.

Generally, the computing system 16 may mine publicly available data received from the various data sources (e.g., the first data source 12 and the second data source 14) to determine a likelihood that a property is being used for certain uses (e.g. short-term rentals). Use information may be useful for many purposes. In one embodiment, insurance related services may be impacted by use. Indeed, property insurance policies oftentimes include data that is provided by the property owner detailing use of the property. In some situations, the data may no longer be accurate, such as, when the property is being used for short-term rentals and is listed on a rental listing service, such as AirBnb, HomeAway, Vacation Rental By Owner, Craigslist, etc. The computing system 16 may be used to provide a notice of the identified use to the insurance provider so that property insurance policies may be updated. For example, the computing system 16 may compare the first set of property identifying data to the second set of property identifying data to identify a substantial overlap between the first set of property identifying data and the second set of property identifying data. Such an overlap may indicate that the property associated with the first set of property identifying data corresponds to the property associated with the second set of property identifying data. Thus, a use indicated by the second data source 14 may be attributed to a property address or other unique property identifier indicated by the first data source 12. In some embodiments, the computing system 16 may suggest an action based in part upon the overlap between the first property data and the second property data. The overlap between the first set of property identifying data and the second set of property identifying data may indicate a common address between the first property and the second property, thereby indicating that a property is listed on the rental listing service, despite no address being listed on the rental listing service.

In the preceding example, the computing system 16 may suggest increasing a premium of the property insurance policy or increasing an amount of coverage provided by property insurance policy when the use of the property has changed substantially and/or when the risk associated with insuring the property has risen. Examples of increased risk may include a greater number of temporary residents (e.g., renters) occupying the property or smokers occupying the property.

Figure 2:
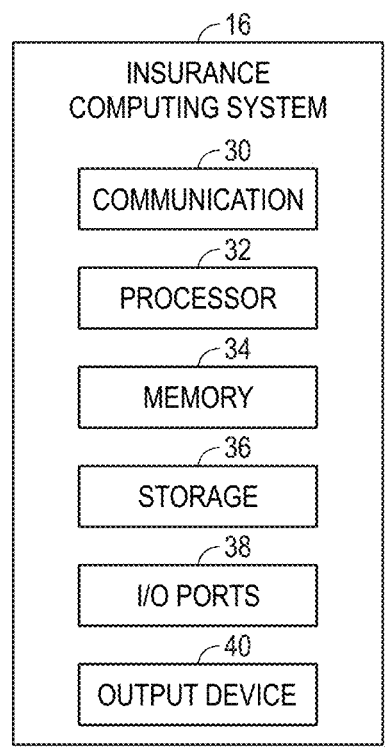
FIG. 2 illustrates a block diagram of components that may be part of a computing system of the property use identification system of FIG. 1, in accordance with embodiments described herein.

The computing system 16 may include certain components to facilitate these actions. FIG. 2 is a block diagram of example components within the computing system 16. For example, the computing system 16 may include a communication component 30, a processor 32, a memory 34, a storage 36, input/output (I/O) ports 38, an output device 40 (e.g., a display or a speaker), or any of a variety of other components that enable the computing system 16 to carry out the techniques described herein. The communication component 30 may be a wireless or wired communication component that may facilitate communication with the first data source 12 and the second data source 14.

The processor 32 may be any suitable type of computer processor or microprocessor capable of executing computer-executable code. The processor 32 may also include multiple processors that may perform the operations described below. The memory 34 and the storage 36 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 34 and the storage 36 may also be used to store the data, various other software applications, and the like. The memory 34 and the storage 36 may represent non-transitory computer-readable media (e.g., any suitable form of memory or storage) that may store the processor-executable code used by the processor 32 to perform various techniques described herein. It should be noted that non-transitory merely indicates that the media is tangible and not a signal.

The I/O ports 38 may be interfaces that may couple to other peripheral components such as input devices (e.g., keyboard, mouse), sensors, input/output (I/O) modules, and the like. The output device 40 may operate to depict indications associated with software or executable code processed by the processor 32. In one embodiment, the output device 40 may be an input device. For example, the output device 40 may include a touch display capable of receiving inputs from a user of the computing system 16. The output device 40 may be any suitable type of display, such as a liquid crystal display (LCD), plasma display, or an organic light emitting diode (OLED) display, for example. In one embodiment, the output device 40 may depict or otherwise provide the one or more notices described above regarding a type of property use.

It should be noted that the components described above with regard to the computing system 16 are exemplary components and the computing system 16 may include additional or fewer components as shown. With the foregoing in mind, additional details with regard to comparing the first set of property identifying data to the second set of property identifying data to determine whether an insurance policy may be updated is discussed below with reference to FIG. 3.

Figure 3:
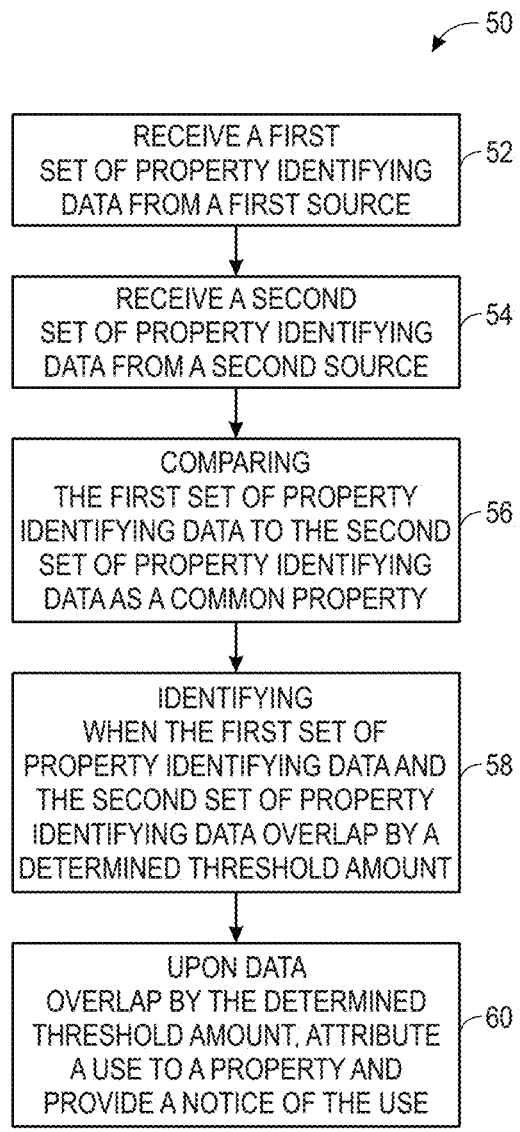
FIG. 3 illustrates a flow chart of a method for determining a property use using the property use identification system of FIG. 1, in accordance with embodiments described herein.

FIG. 3 illustrates a flow chart of a method for identifying property use using the property use identification system of FIG. 1. The following example uses an insurance provider as a context for use of the property use identification service, but embodiments are not intended to be limited to such a context, as the property use identification service described may be useful in a number of fields.

The following description of the method 50 will be described as being performed by the computing system 16, but it should be noted that any suitable processor-based device may be specially programmed to perform any of the methods described herein. Moreover, although the following description of the method 50 is described in a particular order, it should be understood that the method 50 may be performed in any suitable order in other embodiments.

At block 52, the computing system 16 may receive a first set of property identifying data from a first data source 12. The first data source 12 may include any number of rental listing services or other electronic data providing services, which provide an indication of use of a property. For example, one such type of first data source 12 may include short-term rental listing services. Examples of such rental listing services may include AirBnb, HomeAway, Vacation Rental By Owner, Craigslist, or any other similar service. The first set of property identifying data may include data that can be collected or scraped from the property listing on the first data source 12. The first set of property identifying data may include, but is not limited to a geographic area, a zip code, a neighborhood name, an intersection, a property description, a number of bedrooms, a number of bathrooms, a property image, a general vicinity, a property owner's name, a property owner's contact information, or an amount of time from a landmark.

At block 54, the computing system 16 may receive a second set of property identifying data from a second data source 14. The second data source 14 may include any real estate selling services, such as Zillow, Trulia, Redfin, Realtor.com, Century 21, or any other real estate selling service. The second set of property identifying data may include data that can be collected or scraped from the property listing on the second data source 14. The second set of property identifying data may include, but is not limited to a listing price, a listing type, a number of days listed, a number of square feet, a lot size, a year built, a keyword, a building material, a geographic area, a zip code, a neighborhood, a property description, a number of bedrooms, a number of bathrooms, a number of spaces for a parking garage, a parking garage description, or a proximity to or an amount of time from a landmark.

At block 56, the computing system 16 may compare the first set of property identifying data to the second set of property identifying data. For example, the computing system 16 may compare one or more of the first set of property identifying data (e.g., a zip code) to one or more of the second set of property identifying data (e.g., a listing type). The computing system 16 may be repeated until all or a portion of the sets of property identifying data have been compared. As will be explained in further detail below with reference to FIG. 6, the computing system 16 may apply different weighted values to the comparisons between the first set of property identifying data and the second set of property identifying data.

At block 58, the computing system 16 may identify when the first set of property identifying data overlaps with the second set of property identifying data by more than a threshold amount. The threshold amount may be defined as a number of matched identifying data between the first set of property identifying data and the second set of property identifying data, a percentage of matched identifying data, or any other suitable manner of determining the threshold amount. As may be appreciated, the threshold amount may vary for each of the first data sources 12, the second data sources 14, or may vary depending on a number of or accuracy of the scraped values that the computing system 16 can recover.

At block 60, the computing system 16 may generate a notice to alert a service provider or other entity (e.g., the insurance provider) the use of the property has changed. The insurance provider may then review the matched identifying data. In some embodiments, the insurance provider may determine that the property insurance policy should be adjusted based upon the matched identifying data. For example, if the insurance provider can determine that the property now is listed on a short-term rental site and, thus, temporary residents may be regularly occupying the property, the insurance provider may mandate an increase the required coverage of the property insurance policy.

Figure 4A:
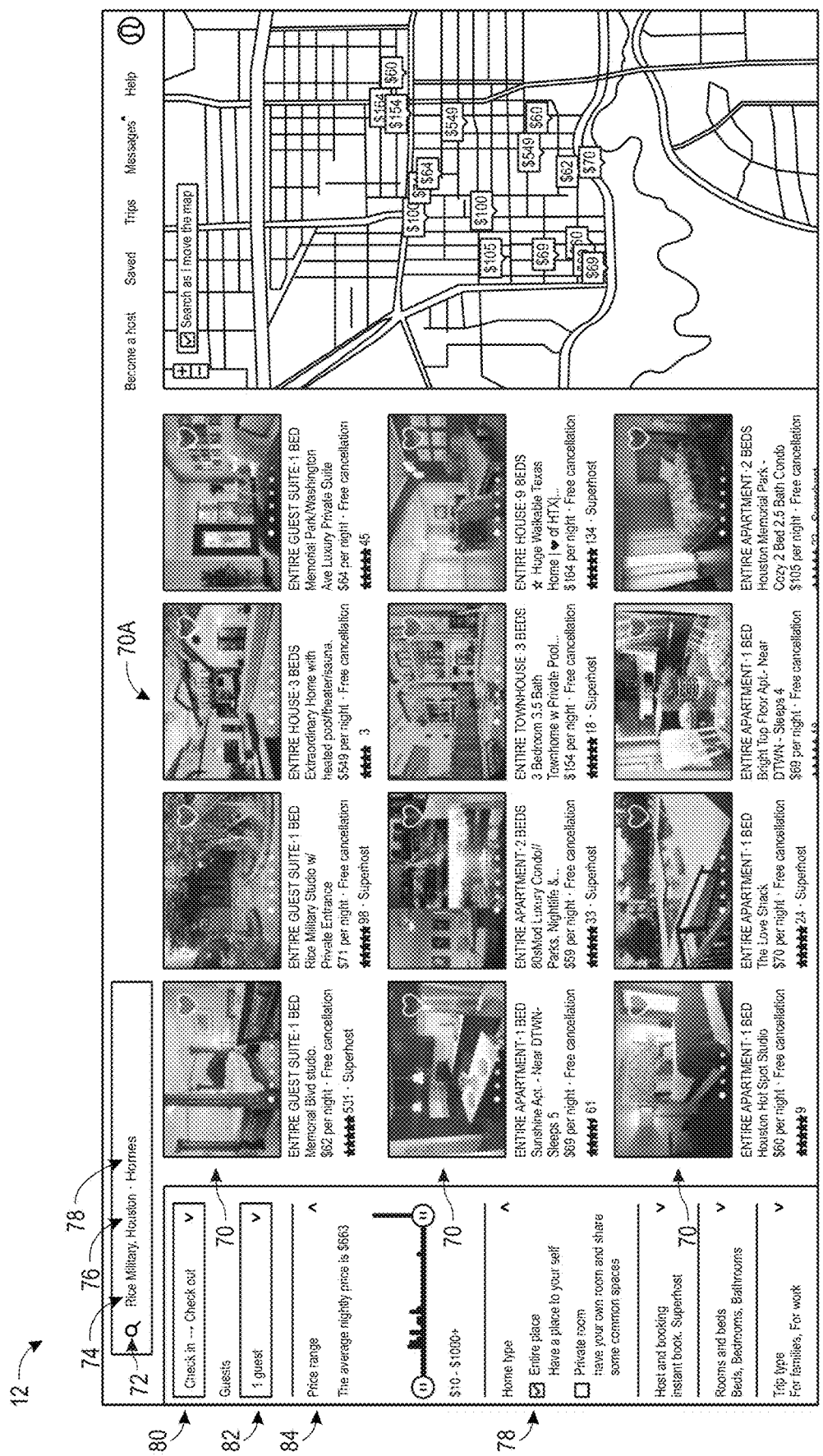
Figure 4B:
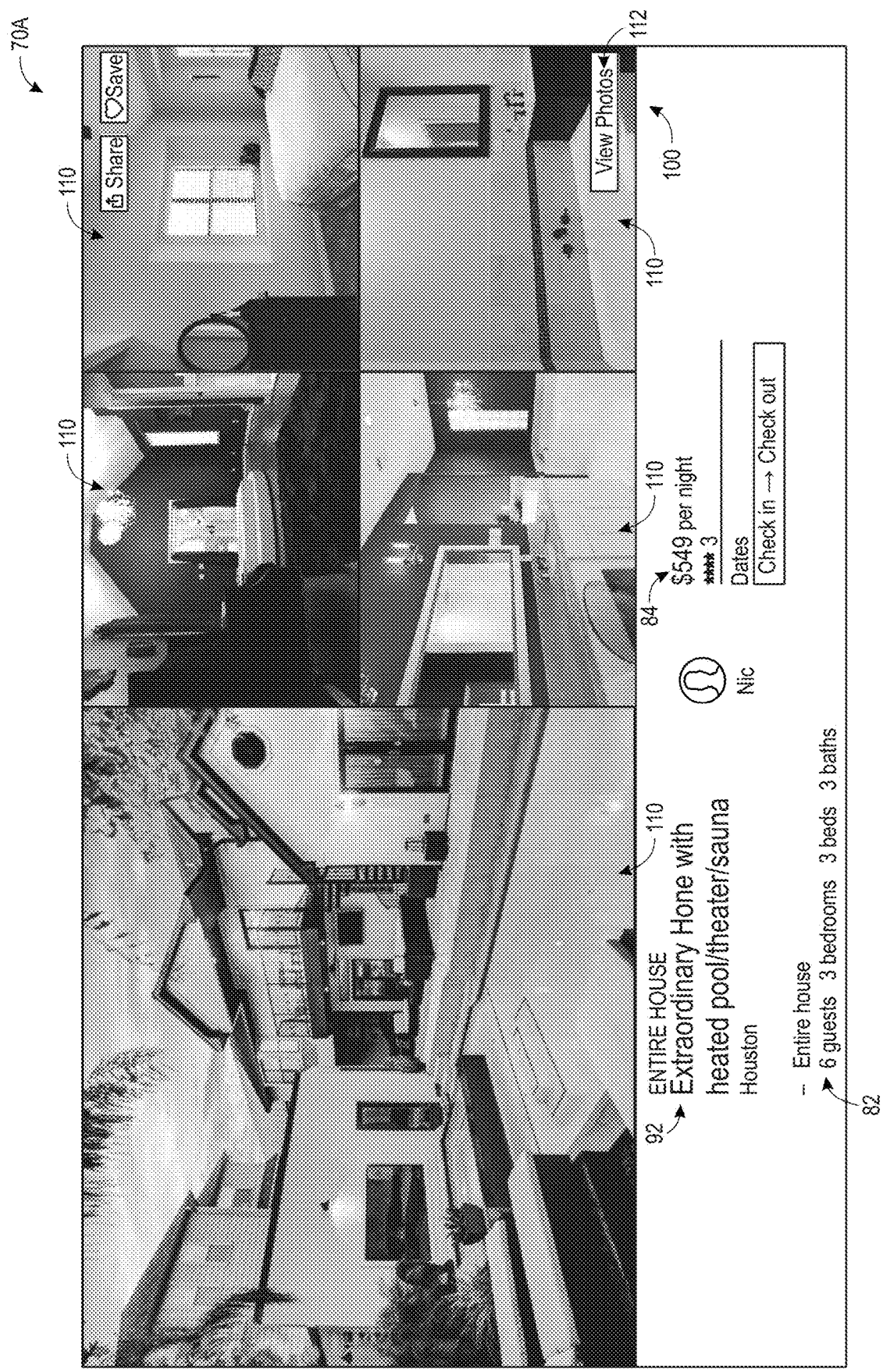
Figure 4D:
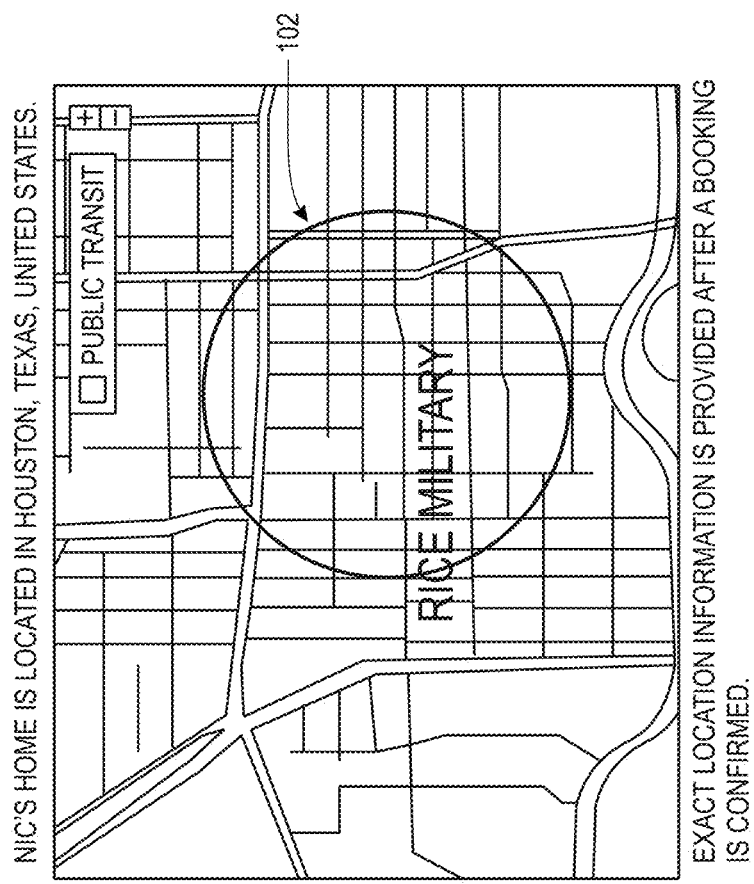
Figure 5A:
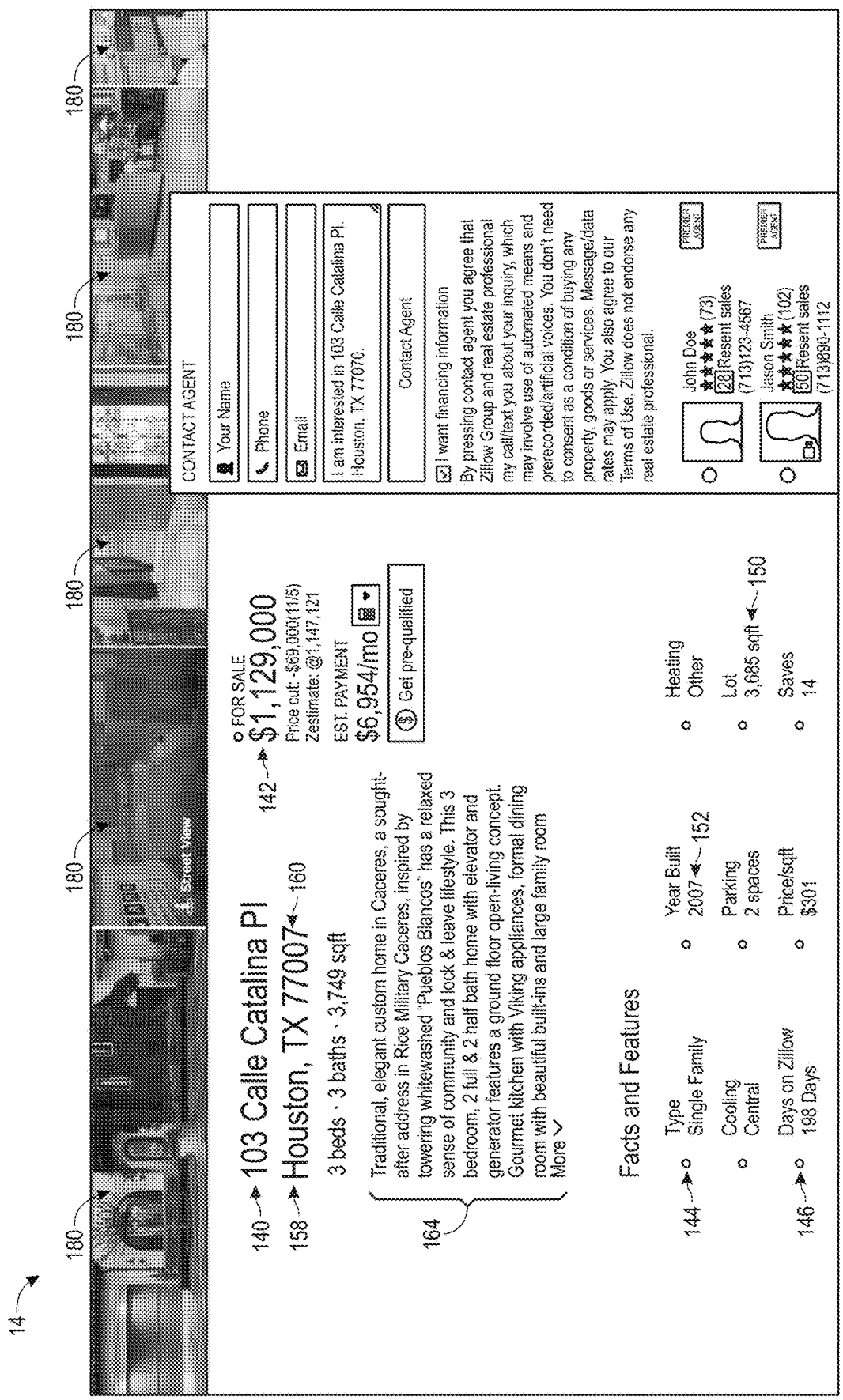
Figure 5D:
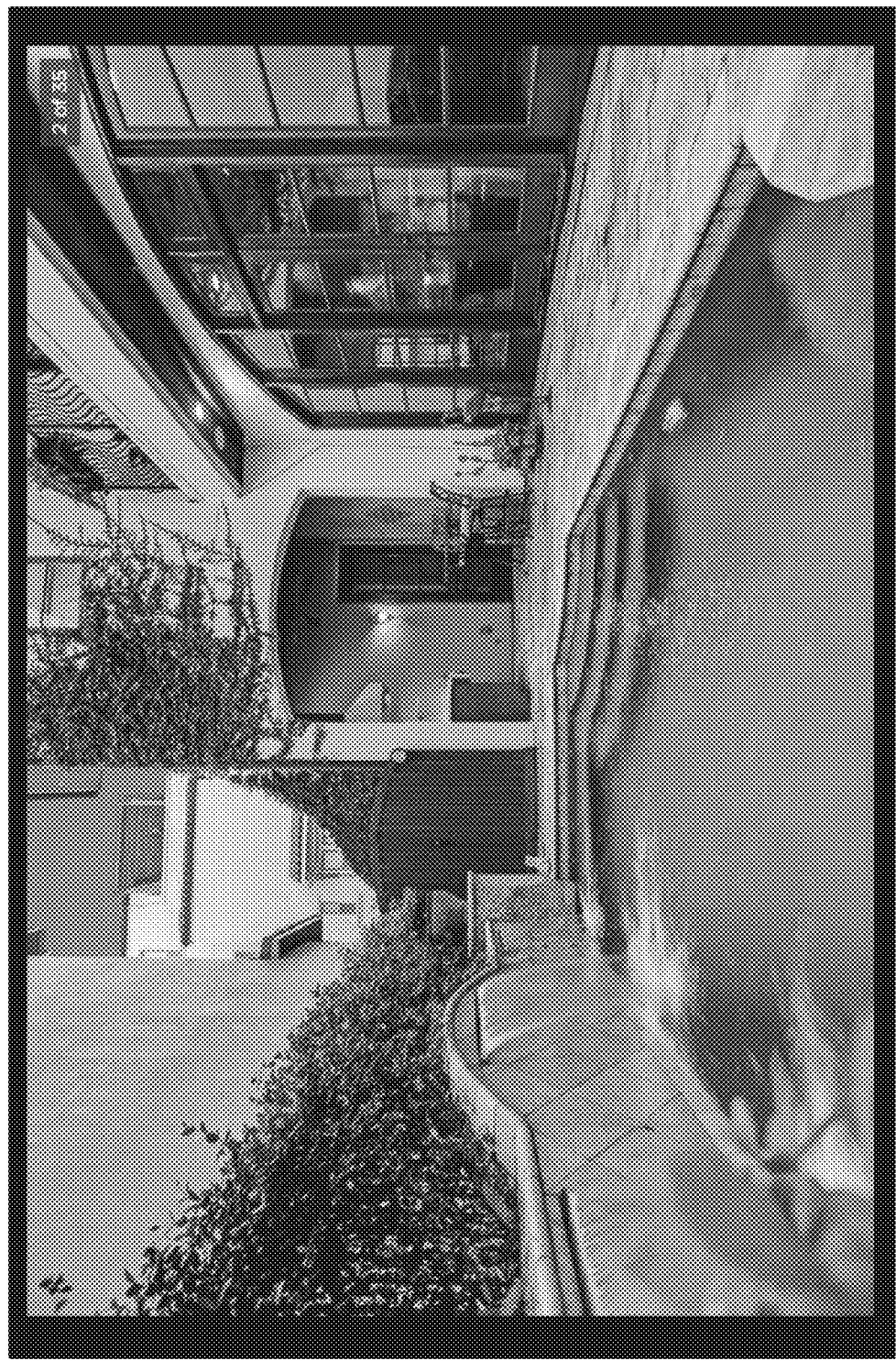

FIG. 4A illustrates a screen shot of a first data source comprising a rental listing service for use by the property use identification system of FIG. 1, in accordance with embodiments described herein. As described above, the first data source provides a first set of property identifying data and specifically excludes a property address of a first property listing. In the illustrated example, the first data source 12 is a screen shot of a short-term rental site AirBnB. There are multiple rental listings 70 listed as options for a short-term rental for a location 72. In the example, the location 72 includes a neighborhood 74 (here "Rice Military"), a city 76 (here "Houston"), and a property type 78 (here "Entire place"). A toolbar 80 can be expanded to list other data that may be scraped by computing system 16. For example, other data that may be collected could include a number of guests 82 that the property can accommodate or a rental price (or a price range) 84. The majority of the first set of property identifying data can be scraped from detailed descriptions associated with a particular rental listing 70A. FIGS. 4B-4D illustrate screen shots of the particular rental listing 70A.

The computing system 16 may mine the particular rental listing 70A to extract at least some of the remaining of the first set of property identifying data. In some instances, this may be facilitated by exposed application programming interfaces (APIs) of the first data source. Specifically, the mined first set of property identifying data may include, but is not limited to a geographic area 86, a zip code 88, neighborhood name 74, an intersection 90, a property tag 92, a property description 94, a number of bedrooms 96, a number of bathrooms 98, a property image 100, a general vicinity 102, a property owner's name 104, a property owner's contact information (e.g., email address, phone number, etc.) 106, or an amount of time from a landmark 108. It may be appreciated that the computing system 16 scrapes the rental listing service's website to collect at least a portion of the first set of property identifying data. In the illustrated embodiment, the computing system 16 scrapes the rental listing website to collect data for the geographic area 86 (here "Houston"), as shown in FIG. 4C.

When the property listing includes images, the computing system 16 collects one or more images 110 associated with the first property listing. Here, the computing system 16 collects the images 110 of the first property listing and any other images that may be associated with the property by selecting a button 112 of the first property listing to collect the property images 100. Similarly, the computing system 16 collects one or more street names associated with the general vicinity 102, as shown in FIG. 4D. In the illustrated embodiment, the street names Asbury St., Detering St., Lester St., Reinerman St., Roy St., Sandman St., Bethje St., Nett St., Center St., Lillian St., Rose St., Floyd St., Blossom St., Gibson St., Feagan St., and Dickson St. are collected from the rental listing service website for the general vicinity 102. The remaining values for the first set of property identifying data collected by the computing system 16 is summarized below in Table 1.

TABLE 1

First set of property identifying data

| First Set of Property Identifying Data | Element | Scraped Value |
| --- | --- | --- |
| Zip Code | 88 | n/a |
| Neighborhood Name | 74 | Rice Military |
| Intersection | 90 | n/a |
| Property Tag | 92 | Extraordinary Property with heated pool/ theatre/sauna |
| Property Description | 94 | Extraordinary Memorial Park property on large private lot . . . 3 car garage! |
| No. of Bedrooms | 96 | 3 |
| No. of Bathrooms | 98 | 3 |
| Property Owner's Name | 104 | Nic |
| Property Owner's Contact Info. | 106 | n/a |
| Amount of Time from Landmark | 108 | n/a |

In some embodiments, the computing system 16 may be particularly interested in a specific property having a specific known address. Though specific addresses may not be searchable on the first data source, the computing system 16 may request listings (e.g., data records) for properties in a vicinity of the known address. For example, if the known address is in the "Rice Military" neighborhood, the computing system may request the listings in Rice Military, the results of which are shown in FIG. 4A.

FIGS. 5A-5D illustrate screen shots of a second data source 14 comprising a real estate selling service using the property use identification property system of FIG. 1, in accordance with embodiments described herein. As described above, the second data source 14 provides a second set of property identifying data and includes a property address 140 of a second property listing. In the illustrated example, the second data source 14 is a screen shot of a real estate selling service Zillow. In FIGS. 5A-D, the computing system 16 mines data from the second data source 14 similar to manner described above in FIGS. 4A-4D. Specifically, the mined second set of property identifying data may include, but is not limited to a listing price 142, a listing type 144, a number of days listed 146, a number of square feet 148, a lot size 150, a year built 152, a keyword 154, a building material 156, a geographic area 158, a zip code 160, a neighborhood 162, a property description 164, a number of bedrooms 166, a number of bathrooms 168, a number of spaces for a parking garage 170, a parking garage description 172, one or more second property images 174, or a proximity to or an amount of time from a landmark 176.

As described above, when the second property listing includes images, the computing system 16 collects one or more images associated with the second property listing. Here, the computing system 16 collects the images 180 of the second property listing and any other images that may be associated with the property listing to collect the one or more property images 174 from the second data source 14. The remaining values for the second set of property identifying data are scraped by the computing system 16 and are summarized below in Table 2.

TABLE 2

Second set of property identifying data

| Second Set of Property Identifying Data | Element | Scraped Value |
| --- | --- | --- |
| Price | 142 | $1,129,000.00 |
| Listing Type | 144 | Single Family |
| No. of Days Listed | 146 | 198 days |
| No. of Square Feet | 148 | 3749 sq. ft. |
| Lot Size | 150 | 3,685 sq. ft. |
| Year Built | 152 | 2007 |
| Key Words | 154 | Pool |
| Building Material | 156 | Stucco |
| Geographic area | 158 | Houston, Tx |
| Zip Code | 160 | 77007 |
| Neighborhood | 162 | Rice Military/Washington Corridor |
| Property Description | 164 | Traditional, elegant custom property . . . large family room |
| No. of Bedrooms | 166 | 3 |
| No. of Bathrooms | 168 | 2 full, 2 half |
| Parking Spaces | 170 | 2 |
| Parking Garage Description | 172 | Attached garage |
| Amount of time to landmark | 176 | n/a |

Figure 6:
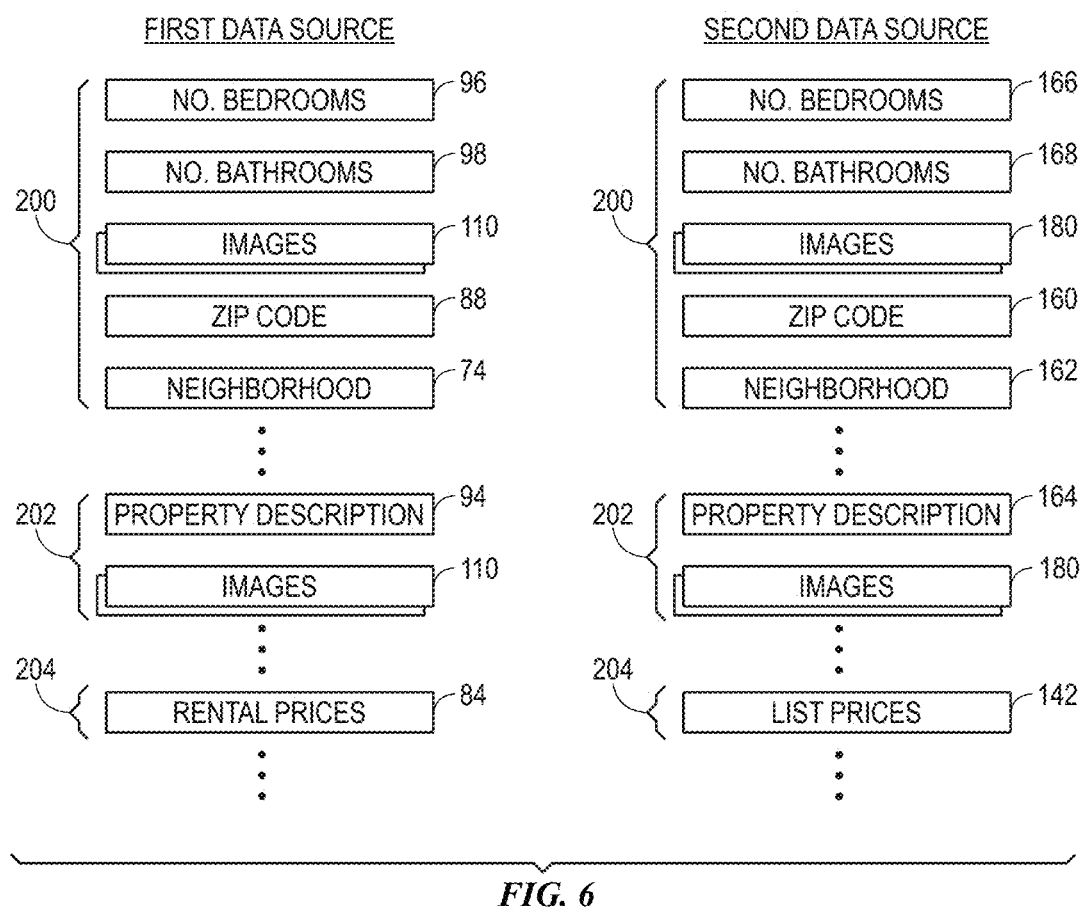
FIG. 6 depicts a diagram illustrating the comparison of FIG. 3 in more detail, in accordance with embodiments described herein.

FIG. 6 depicts a diagram illustrating the comparison process of block 56 of the flow chart of FIG. 3, in accordance with embodiments described herein. As described above, the computing system 16 compares one or more of the first set of property identifying data (e.g., a zip code) to one or more of the second set of property identifying data (e.g., a listing type). In some embodiments, the computing system 16 may assign a higher weight 200 to certain data or may assign a higher weight 200 to certain data when other criteria is met within a listing. For example, a match (or a mismatch) between the number of bedrooms 96 of the first set of property identifying data of the first property listing and the number of number of bedrooms 166 of the second set of property identifying data of the second property listing may be highly weighted relative to other data. Indeed, a mismatch between the number of bedrooms 96 of the first set of property identifying data and the number of number of bedrooms 166 of the second set of property identifying data would suggest that the first property listing and the second property listing are not a common property. However, this may only be the case when an entire property is rented. Some services may provide listings for less than a whole portion of the property. Therefore, some listings may not include a description for the whole property, but instead only a portion of the property. In such embodiments, the higher weighting 200 may depend upon the type of listing (e.g., "whole house" or "room"). In contrast, when there is a match between the number of bedrooms 96 of the first set of property identifying data and the number of number of bedrooms 166 of the second set of property identifying data, the computing system 16 may determine that the first property listing and the second property listing may indeed be more likely to be a common property and considers the match as one of many possible matched pairs of data.

Similarly, a match (or a mismatch) between the number of bathrooms 98 of the first set of property identifying data of the first property listing and the number of number of bathrooms 168 of the second set of property identifying data of the second property listing would be highly weighted relative to the other data because a mismatch would provide a strong indication that the first property listing and the second property listing are not a common property. Certain data may be more likely than others to provide a strong indication of a match or mismatch, such as zip codes 88, 160 or neighborhoods 74, 162. Similarly, the street names associated with the general vicinity 102 and the address 140 can provide a strong indication of a match or mismatch.

The computing system 16 may assign a medium weight 202 to certain data in the comparison process. For example, the property description 94 of the first property identifying data compared to the property description 164 of the second property identifying data may only partially overlap or may not overlap at all, in part due to the variations that can occur when describing a property. The computing system 16 may scrape the property descriptions 94, 164 to determine if there is any relevant overlap between the descriptions. For example, the property description 94 describes the first property listing as having "custom ironwork," while the property description 164 describes the second property listing as a "traditional, elegant custom property." The word "custom" in the first property listing appears to only refer to a custom iron staircase, while the word "custom" in the second property listing appears to refer to the entire property. Here, the computing system 16 may weigh the relevance of the partial match between the property descriptions 94, 164 relatively low relative to the number of bedrooms 96, 166 described above.

As may be appreciated, the computing system 16 may assign a low weight 204 to some of the data in the comparison process. Specifically, the computing system 16 may determine that certain data can be considered less in determining a match or mismatch, particularly when the data is not able to readily be compared. For example, the second set of property identifying data of the second property listing includes the list price 142 (here "$1,129,000.00"). However, the first set of property identifying data does not include a list price for sale of the first property listing because the first data source 12 is a rental listing service. The only price listed for the first property listing is the rental price 84 for a nightly stay (here "$549.00"). Because of the vast difference in price and offering (sale vs. nightly rental), the computing system 16 would weight the comparison between the list price 142 and the rental price 84 relatively low compared to the number of bedrooms 96, 166 and the property descriptions 94, 164 described above.

It may be appreciated that the first property identifying data and the second property identifying data may include different data that cannot always be matched, due to certain data being unavailable to be scraped by the computing system 16. For example, the first data source 12 may not include information about the size (e.g., square feet) of the property or lot size of the first rental listing because such information is not usually of interest to a short-term renter and, thus, is not provided by the short-term rental listing service. However, the computing system 16 may compare the images 110 of the first property listing to the number of square feet 148 or the lot size 150 to estimate whether the images 110 may indicate enough square footage of the first property listing to be approximately the same as or within a range of the number of square feet 148 or the lot size 150 of the second property listing.

The computing system 16 may also compare metadata associated with the one or more first images 110 of the first property listing to metadata of the one or more second images 180, the key words 154, the building materials 156, or other data of the second property listing. In one example, the computing system 16 may compare the images 110 of the first property listing to determine that the first property listing has a pool, which matches the key word 154 "pool" of the second property listing. The computing system 16 may also compare the images 110 of the first property listing to the images 180 of the second property listing to compare the pools. The computing system 16 may analyze the shape of the pool, the surroundings of the pool, the number or shape of the stairs leading into the pool, and so forth. Here, the computing system 16 determines that the pool of the first property listing is indeed different than the pool of the second property listing due to the shape of the pool stairs varying significantly in the images 110 of the first property listing (e.g., rectangular stairs) and the second property (e.g., round stairs) and the differences in the surroundings.

In some embodiments, the computing system 16 may assign a positive weight to a match and a negative weight to a mismatch. For example, certain listings (e.g., short-term rentals) may be more likely than others listings (e.g., listings for sale) to feature certain pictures that may be of greater interest to a short term renter than a potential buyer that would care to see a greater number of detailed images of a property listing. In the foregoing example, the computing system 16 assigned a positive weight to a match, though it should be appreciated that the computing system 16 may assign a negative weight to a match and a positive weight to a mismatch depending on the context of the identifying information.

The computing system 16 may also attempt to fill gaps between the first property identifying data and the second property identifying data via additional services. In one example, with access to information pertaining to the property owner's bank account, the computing system 16 can mine data to determine if payments were received from a short-term rental site. In another example, when the computing system 16 determines that there is a match classified as the low weight 204, the computing system 16 may scrape a third data source (i.e., a third property identifying data source) to determine if additional data collected from the third data source may provide more data to compare to the first property identifying data and/or the second property identifying data to improve the low weight 204 match (e.g., to the medium weight 202, etc.).

For example, the computing system 16 may determine that there is no match of a first name or a last name between the property owner's name 104 of the first set of property identifying data and the second set of property identifying data. Here, the computing system 16 may scrape the second data source 14 to determine the address of the second property listing. The computing system 16 may then scrape the third data source (e.g., a property tax website) to collect a property owner's name associated with the address of the second property listing. The computing system 16 can then compare the property owner's name that was scraped from the third data source to the first set of property identifying data to derive a match. It should be appreciated that the computing system 16 may consider abbreviated names (e.g., Robert abbreviated as Rob) or known nicknames (e.g., Chuck as a nickname for Charles) as a match. Similarly, the computing system 16 may use middle names or middle initials to determine a match.

As may be appreciated, the computing system 16 may continue through numerous iterations and comparisons between the first property identifying data and the second property identifying data. As described above with reference to FIG. 3, when the computing system 16 determines the first property identifying data and the second property identifying data overlap by a threshold amount, a notice is generated to alert the insurance provider. When the first property identifying data and the second property identifying data do not overlap past the threshold amount, the computing system 16 does not alert the insurance provider.

In the preceding example, the computing system 16 determines that the first property listing is indeed different than the second property listing. As such, a notice is not generated to the service provider (e.g., insurance provider). However, if the first property identifying data and the second property identifying data did overlap enough to meet or exceed the threshold amount, the internal computing system 16 would notify the service provider (e.g., insurance provider).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A processor-implemented method for detecting use of a property, comprising:
    providing a first request for records in vicinity to a known property address to an application programming interface (API) of a first source comprising a short-term rental web-service that indicates short-term rental use and does not publicly provide an address of a property prior to initiation of a request for use of the property;
    in response to providing the first request for records, receiving a first set of property identifying data for a first property from the first source of the short-term rental web-service, via the API;
    providing a second request for records specific to the known property address to an API of a second source comprising a second web-service;
    in response to providing the second request for records, receiving a second set of property identifying data for a second property from the second source associated with the known property address, via the API;
    comparing one or more first property identifying data values of the first set of property identifying data to one or more second property identifying data values of the second set of property identifying data to produce one or more matched property identifying data sets, one or more unmatched property identifying data sets, or both;
    assigning one or more weighted values to the one or more matched property identifying data sets, the one or more unmatched property identifying data sets, or both, wherein the one or more weighted values are based on one or more characteristics of the first set of property identifying data;
    determining an amount of overlap based on the one or more weighted values of the one or more matched property identifying data sets, the one or more unmatched property identifying data sets, or both;
    determining that the amount of overlap does not meet a pre-defined threshold amount;
    in response to determining that the amount of overlap does not meet the pre-defined threshold amount, identifying, from a third data source, one or more third property identifying data values associated with the known property address to match with the first property identifying data values to generate one or more higher-weighted matched property identifying data sets;
    determining that the amount of overlap in conjunction with the one or more higher-weighted matched property identifying data sets, meets the pre-defined threshold amount;
    based upon the amount of overlap meeting the pre-defined threshold amount:
        identifying the first property and the second property as a common property;
        identifying short-term rental use as a new use at the known property address, by correlating the short-term rental use indicated by the first source with the property address provided by the second source, based upon identifying the first property and the second property as the common property; and
        automatically adjusting a service associated with the known property address, based upon identifying the short-term rental use as the new use at the known property address.

2. The processor-implemented method of claim 1, wherein the one or more first property identifying data values comprises a geographic area, a zip code, a neighborhood name, an intersection, a property tag comprising a brief description of a property, a property description, a number of bedrooms, a number of bathrooms, a property image, a general vicinity, a property owner's name, a property owner's contact information, an amount of time from a landmark, or any combination thereof.

3. The processor-implemented method of claim 2, wherein the one or more first property identifying data values is mined from a user review.

4. The processor-implemented method of claim 1, wherein the second source comprises a real estate listing service that lists properties for sale.

5. The processor-implemented method of claim 1, wherein the one or more second property identifying data values comprises a listing price, a listing type, a number of days listed, a number of square feet, a lot size, a year built, a keyword, a building material, a geographic area, a zip code, a neighborhood, a property description, a number of bedrooms, a number of bathrooms, a number of spaces for a parking garage, a parking garage description, one or more property images, a proximity to or an amount of time from a landmark, or any combination thereof.

6. The processor-implemented method of claim 1, wherein the pre-defined threshold amount comprises an amount of weighted matched property identifying data sets, unmatched property identifying data sets, or both between the one or more first property identifying data values and the one or more second property identifying data values.

7. The processor-implemented method of claim 1, comprising:
a identifying the one or more third property identifying data values based on the first set of property identifying data, the second set of property identifying data, or both; and
performing the comparing using the one or more third property identifying data values in place of the one or more second property identifying data values of one or more lower-weighted matched property identifying data sets.

8. The processor-implemented method of claim 7, wherein identifying the one or more third property identifying data values comprises accessing the third data source to identify additional information, missing information, or both about the first property, the second property, or both.

9. A tangible, non-transitory, machine-readable medium, comprising machine-readable instructions that, when executed by one or more processors, cause the one or more processors to:
provide a first request for records in vicinity to a known property address to an application programming interface (API) of a first source comprising a short-term rental web-service that indicates short-term rental use and does not publicly provide an address of a property prior to initiation of a request for use of the property;
in response to providing the first request for records, receive a first set of property identifying data for a first property from the first source of the short-term rental web-service, via the API;
provide a second request for records specific to the known property address to an API of a second source comprising a second web-service;
in response to providing the second request for records, receive a second set of property identifying data for a second property from the second source associated with the known property address, via the API;
compare one or more first property identifying data values of the first set of property identifying data to one or more second property identifying data values of the second set of property identifying data to produce one or more matched property identifying data sets, one or more unmatched property identifying data sets, or both;
assign one or more weighted values to the one or more matched property identifying data sets, the one or more unmatched property identifying data sets, or both, wherein the one or more weighted values are based on one or more characteristics of the first set of property identifying data;
determine an amount of overlap based on the one or more weighted values of the one or more matched property identifying data sets, the one or more unmatched property identifying data sets, or both;
determine if the amount of the overlap meets a pre-defined threshold amount;
in response to determining that the amount of overlap does not meet the pre-defined threshold amount, identify, from a third data source, one or more third property identifying data values associated with the known property address to match with the first property identifying data values to generate one or more higher-weighted matched property identifying data sets, one or more higher-weighted unmatched property identifying data sets, or both;
when the amount of the overlap in conjunction with the one or more higher-weighted matched property identifying data sets, the one or more higher-weighted unmatched property identifying data sets, or both meets the pre-defined threshold amount:
identify the first property and the second property as a common property;
identify short-term rental use as a new use at the known property address, by correlating the short-term rental use indicated by the first source with the property address provided by the second source, based upon identifying the first property and the second property as the common property; and
automatically adjust a service associated with the known property address, based upon identifying the short-term rental use as the new use at the known property address; and
when the amount of the overlap in conjunction with the one or more higher-weighted matched property identifying data sets, the one or more higher-weighted unmatched property identifying data sets, or both does not meet the pre-defined threshold amount:
abstain from identifying the first property and the second property as the common property.

10. The non-transitory machine readable medium of claim 9, wherein the one or more first property identifying data values comprises a geographic area, a zip code, a neighborhood name, an intersection, a property tag comprising a brief description of a property, a property description, a number of bedrooms, a number of bathrooms, a property image, a general vicinity, a property owner's name, a property owner's contact information, an amount of time from a landmark, or any combination thereof.

11. The non-transitory machine readable medium of claim 10, wherein the one or more first property identifying data values is mined from a user review.

12. The non-transitory machine readable medium of claim 9, wherein the second source comprises a real estate listing service that lists properties for sale.

13. The non-transitory machine readable medium of claim 9, wherein the one or more second property identifying data values comprises a listing price, a listing type, a number of days listed, a number of square feet, a lot size, a year built, a keyword, a building material, a geographic area, a zip code, a neighborhood, a property description, a number of bedrooms, a number of bathrooms, a number of spaces for a parking garage, a parking garage description, one or more property images, a proximity to or an amount of time from a landmark, or any combination thereof.

14. The non-transitory machine readable medium of claim 9, wherein the pre-defined threshold amount comprises an amount of weighted matched property identifying data sets, unmatched property identifying data sets, or both between the one or more first property identifying data values and the one or more second property identifying data values.

15. The non-transitory machine readable medium of claim 9, wherein the processor is configured to:
identify the one or more third property identifying data values based on the first property identifying data, the second property identifying data, or both; and
perform the comparing using the one or more third property identifying data values in place of the one or more second property identifying data values of one or more lower-weighted matched property identifying data sets, one or more lower-weighted unmatched property identifying data sets, or both.

16. The non-transitory machine readable medium of claim 9, wherein the processor is configured to:
access the third data source to identify the one or more third set of property identifying data values associated with additional information, missing information, or both of the first set of property identifying data, the second set of property identifying data, or both.

17. A computer system, comprising:
a processor configured to:
provide a first request for records in vicinity to a known property address to an application programming interface (API) of a first source comprising a short-term rental web-service that indicates short-term rental use and does not publicly provide an address of a property prior to initiation of a request for use of the property;
in response to providing the first request for records, receive a first set of property identifying data for a first property from the first source of the short-term rental web-service, via the API;
provide a second request for records specific to the known property address to an API of a second source comprising a second web-service;
in response to providing the second request for records, receive a second set of property identifying data for a second property from the second source associated with the known property address, via the API;
compare one or more first property identifying data values of the first set of property identifying data to one or more second property identifying data values of the second set of property identifying data to produce one or more matched property identifying data sets, one or more unmatched property identifying data sets, or both;
assign one or more weighted values to the one or more matched property identifying data sets, the one or more unmatched property identifying data sets, or both, wherein the one or more weighted values are based on one or more characteristics of the first set of property identifying data;
determine an amount of overlap based on the one or more weighted values of the one or more matched property identifying data sets, the one or more unmatched property identifying data sets, or both,
determine if the amount of the overlap meets a pre-defined threshold amount;
in response to determining that the amount of overlap does not meet the pre-defined threshold amount, identify, from a third data source, one or more third property identifying data values associated with the known property address to match with the first property identifying data values to generate one or more higher-weighted matched property identifying data sets, one or more higher-weighted unmatched property identifying data sets, or both;
when the amount of the overlap in conjunction with the one or more higher-weighted matched property identifying data sets, the one or more higher-weighted unmatched property identifying data sets, or both meets the pre-defined threshold amount:
identify the first property and the second property as a common property;
identify short-term rental use as a new use at the known property address, by correlating the short-term rental use indicated by the first source with the property address provided by the second source, based upon identifying the first property and the second property as the common property; and
automatically adjust a service associated with the known property address, based upon identifying the short-term rental use as the new use at the known property address; and
when the amount of the overlap in conjunction with the one or more higher-weighted matched property identifying data sets, the one or more higher-weighted unmatched property identifying data sets, or both does not meet the pre-defined threshold amount:
abstain from identifying the first property and the second property as the common property.

18. The system of claim 17, wherein the pre-defined threshold amount comprises an amount of weighted matched property identifying data sets, unmatched property identifying data sets, or both between the one or more first property identifying data values and the one or more second property identifying data values.

19. The system of claim 17, wherein the processor is configured to:
identify the one or more third property identifying data values based on the first set of property identifying data, the second set of property identifying data, or both; and
perform the comparing using the one or more third property identifying data values in place of the one or more second property identifying data values of one or more lower-weighted matched property identifying data sets, one or more lower-weighted unmatched property identifying data sets, or both.

20. The system of claim 17, wherein the processor is configured to:
access the third data source to identify the one or more third set of property identifying data values associated with additional information, missing information, or both of the first set of property identifying data, the second set of property identifying data, or both.

* * * * *